Figure 1:
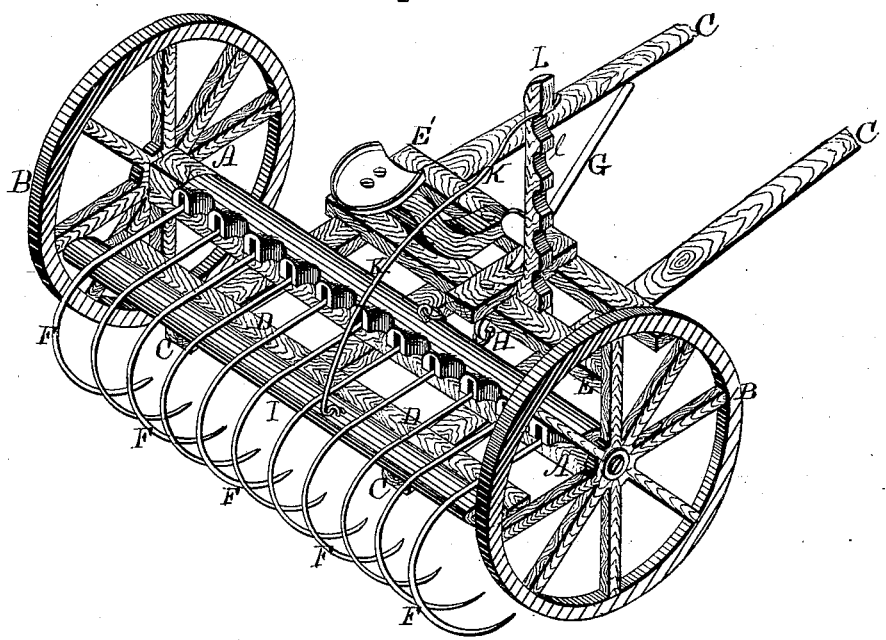

2 Sheets--Sheet 1.

S. ALLEN.
Horse Hay-Rakes.

No. 150,273. Patented April 28, 1874.

WITNESSES:
Jus. E. Hutchinson
John R. Young

INVENTOR.
Samuel Allen, by
Prindle and Dean, his Attys

2 Sheets--Sheet 2.
S. ALLEN.
Horse Hay-Rakes.
No. 150,273. Patented April 28, 1874.
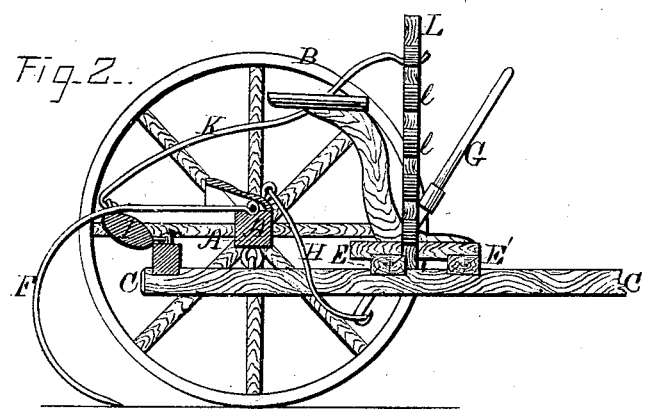
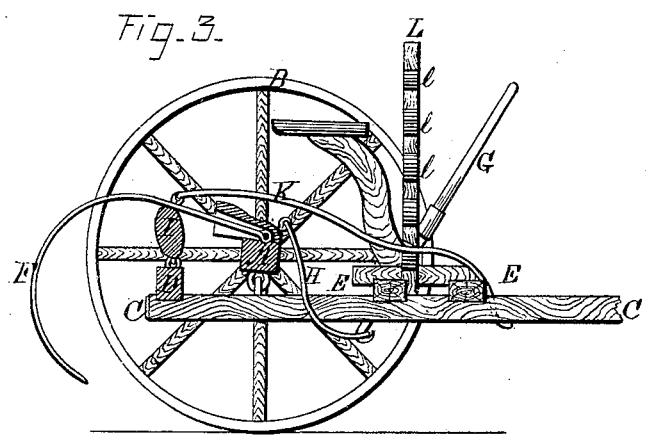
WITNESSES:
Jas. E. Hutchinson
John R. Young
INVENTOR.
Samuel Allen, by
Prindle and Deane, his Attys

UNITED STATES PATENT OFFICE.

SAMUEL ALLEN, OF HONESDALE, PENNSYLVANIA.

IMPROVEMENT IN HORSE HAY-RAKES.

Specification forming part of Letters Patent No. 150,273, dated April 28, 1874; application filed December 12, 1873.

*To all whom it may concern:*

Be it known that I, SAMUEL ALLEN, of Honesdale, in the county of Wayne and in the State of Pennsylvania, have invented certain new and useful Improvements in Horse Hay-Rakes; and do hereby declare that the following is a full, clear, and exact description thereof, reference being had to the accompanying drawings making a part of this specification, in which—

Figure 1 is a perspective view of my improved rake as arranged for use. Fig. 2 is a vertical section of the same upon a line extending from front to rear; and Fig. 3 is a like view of the same, showing the rake-teeth elevated by means of my improved attachment.

Letters of like name and kind refer to like parts in each of the figures.

The design of my invention is to enable the vertical position of the teeth of a horse hay-rake, with relation to the surface of the ground, to be adjusted without interference with the operation of the tripping devices; and to this end it consists in the hinged bearing-bar placed beneath the teeth, and operated in the manner and for the purpose substantially as is hereinafter specified.

In the annexed drawings, A represents the axle of the rake, which has journaled upon its ends suitable ground-wheels B and B, and furnishes a support for a frame, that consists of two shafts, C and C, connected together at their rear ends by means of a cross-bar, D, and at points in front of said axle by two cross-bars, E and E', said shafts being loosely hinged to or upon the lower side of said axle, as shown. The rake-teeth F and F are attached to or upon the upper side of the axle, and from thence extend rearward and downward in a curve, in the usual manner, and are placed in contact with, or removed from, the ground by rotating said axle within its bearings, such rotation being effected by means of a lever, G, which is suitably pivoted upon or between the cross-bars E and E', and has its lower end connected by a loosely-pivoted rod, H, with the upper side of said axle, so that by moving the upper end of said lever rearward it lower end, said rod H, and the upper side of said axle, will be moved forward and the desired tripping movement effected.

In order that the position of the lower ends of the teeth F and F, with relation to the surface of the ground, may be regulated independent of the tripping mechanism, a bar, I, having preferably an oval form in cross-section, is hinged to or upon the upper side of the cross-bar D in such manner as to permit it to turn rearward to the position shown in Figs. 1 and 2, or upward to the position seen in Fig. 3. As the teeth rest upon the upper side or edge of said bar I, it will be seen that, by turning the latter rearward, said teeth will be permitted to drop downward at their rear ends, while by turning said bar forward they will be raised. The radial position of the bearing-bar is changed by means of a lever, K, which is secured upon the upper side of the former, and extends upward and forward within convenient reach of the operator's hand. A bar, L, secured upon, and extending vertically upward from, the frame, and provided upon one edge with a series of notches, $l$, engages with the forward end of said lever K, and locks the same in vertical position when adjusted thereto.

As thus constructed and arranged, the rake is operated as follows: The bearing-bar I is moved forward or to the rear until the lower ends of the teeth occupy the desired position with relation to the surface of the ground, when said bar is locked in place by the engagement of its operating-lever with the notched bar, after which the machine is operated in the usual manner.

It will be seen that, while the tripping mechanism is left entirely free in its operations, the rake-teeth, when permitted to drop downward, cannot fall below a certain point, which point is easily and quickly varied to suit the character of the ground, and the nature of obstructions which may exist upon the surface of the same.

The machine described is far more efficient and easy of operation than would be the case if the vertical adjustment of the teeth depended upon, and was effected by, the tripping mechanism, while the increase in cost over machines of usual construction is but slight, and such increase is more than compensated for by the advantages named.

I am aware that rakes have before been constructed in which the vertical positions of the teeth could be varied without interference with the tripping of said teeth; and, therefore, do not claim, broadly, such construction.

Having thus fully set forth the nature and merits of my invention, what I claim as new is—

In combination with the teeth F and F, pivoted upon the axle A, and tripped by the lever G and rod H, the means employed for regulating the vertical position of the rear ends of said teeth when at work, consisting of the elliptical bar I, hinged to or upon the frame of the machine, and capable of a partial rotation upon its bearings by the lever K, attached directly to said bar and caused to engage with the notched bar L $l$, substantially as specified.

In testimony that I claim the foregoing I have hereunto set my hand this 6th day of December, 1873.

SAMUEL ALLEN.

Witnesses:
  GEO. S. PURDY,
  S. N. BUSHNELL.